United States Patent
Lepka et al.

(10) Patent No.: US 9,496,817 B1
(45) Date of Patent: Nov. 15, 2016

(54) ELECTRIC MOTOR THERMAL MANAGEMENT

(71) Applicant: FREESCALE SEMICONDUCTOR, INC., Austin, TX (US)

(72) Inventors: Jaroslav Lepka, Frenstat Pod Radhostem (CZ); Libor Prokop, Brno (CZ)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/745,456

(22) Filed: Jun. 21, 2015

(51) Int. Cl.
- *G05B 5/00* (2006.01)
- *H02P 29/00* (2016.01)
- *H02P 29/02* (2016.01)

(52) U.S. Cl.
CPC ....... *H02P 29/0055* (2013.01); *H02P 29/0044* (2013.01); *H02P 29/0083* (2013.01); *H02P 29/028* (2013.01)

(58) Field of Classification Search
CPC .............. H02H 7/0833; H02H 7/0852; H02P 29/0055; G01K 7/42
See application file for complete search history.

(56) References Cited

U.S. PATENT DOCUMENTS

| | | | |
|---|---|---|---|
| 7,692,399 B2 | 4/2010 | Harriman et al. | |
| 2011/0279074 A1* | 11/2011 | Yeh | G01K 7/42 318/432 |

FOREIGN PATENT DOCUMENTS

| | | |
|---|---|---|
| EP | 0999629 A1 | 10/2000 |
| JP | 2002345147 A | 11/2002 |

OTHER PUBLICATIONS

Abb, "Termal Overload Relays," downloaded from <<http://new.abb.com/low-voltage/products/motor-protection/3-pole-contactors-and-overload-relays-for-motor-starting/thermal-overload-relays>> on Jun. 19, 2015; 5 pages.

Hurst, K.D., et al., "A thermal monitoring and parameter tuning scheme for induction machines," Conference Record of the 1997 IEEE Industry Applications Conference, 1997; Thirty-Second IAS Annual Meeting, IAS '97; vol. 1; Oct. 5-9, 1997; pp. 136-142.

Rockwell Automation, "Basics for Practical Operation Motor Protection," downloaded from <<https://www.rockwellautomation.com/resources/downloads/rockwellautomation/che/pdf/Basics_practical_operationMotor_protection.pdf>> on Jun. 19, 2015; copyright 1997; 68 pages.

* cited by examiner

*Primary Examiner* — Karen Masih

(57) ABSTRACT

A method and apparatus for electric motor thermal management is provided. A thermal model allows estimation of temperatures of an electric motor and determination of a motor overload condition. The thermal model is based on electrical parameters that can be measured in a motor control circuit. An electric motor control method and circuit utilizes a back electromotive force (EMF) measurement circuit, a processor coupled to the back EMF measurement circuit for receiving a back EMF measurement and for calculating a thermal model of the electric motor, the thermal model based on a stator-to-ambient thermal resistance value accounting for a sum of a stator-to-case thermal resistance and a case-to-ambient thermal resistance, and an electric motor driver circuit coupled to the processor for providing drive signals for controlling delivery of power to the electric motor based on the thermal model of the electric motor.

20 Claims, 7 Drawing Sheets

ELECTRIC MOTOR THERMAL MANAGEMENT

BACKGROUND

1. Field of the Disclosure

This disclosure relates generally to electric motors and more specifically to electric motor thermal management.

2. Background of the Disclosure

Electric motors use electric power to produce motion. Inefficiency of electric motors results in power dissipation in the form of heat. If an electric motor is allowed to overheat, it can be damaged. Thus, a temperature of an electric motor can be monitored to protect the electric motor against an overload condition and overheating. Traditionally, an electromechanical thermal switch has been used to protect an electric motor. However, an electromechanical thermal switch can be expensive, of insufficient reliability, and without a mechanism for verifying its proper operation while in use. Thus, an improved technology for electric motor thermal management is needed.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method and apparatus for electric motor thermal management is provided. In accordance with at least one embodiment, the method and apparatus can be used for detection of a motor overload condition, and for motor thermal protection. In accordance with at least one embodiment, a thermal model is used to estimate temperatures of an electric motor and determination of a motor overload condition. The thermal model is based on electrical parameters that can be measured in a motor control circuit, which, for example, can be stored remotely from the motor. As one example, the method and apparatus can be used to comply with safety standards without the need for an electromechanical thermal switch in the motor. As another example, the method and apparatus can verify proper operation of an electromechanical thermal switch in the motor for super-safe applications.

The thermal model involves two differential equations, one pertaining to the motor winding temperature and one pertaining to the motor mass temperature. The motor winding temperature and the motor mass temperature can be determined using, for example, Laplace transforms. The thermal model accounts for a thermal resistance from the stator to the ambient environment, which includes a thermal resistance from the stator to the motor case and a thermal resistance from the motor case to the ambient environment. In accordance with one embodiment, a processor operating the motor according to the thermal model determines the thermal resistance from the stator to the ambient environment according to the equation $R_{MA}=1/[k_0+k_T(T_M-T_A)]$, where $k_0$ and $k_T$ are conductivity model coefficients to provide a linear approximation covering the convective, conductive, and radiative heat transfers from the motor mass to the ambient environment, wherein $T_M$ is the temperature of the motor mass and $T_A$ is the ambient temperature. Such a linear approximation adequately models nonlinearity over a temperature range resulting from the convective and radiative heat transfers from the motor mass to the ambient environment. In accordance with at least one embodiment, the thermal resistance from the stator to the ambient environment can be determined according to the equation $R_{SA}=R_{SC}+R_{CA}=1/[k_0+k_T(T_S-T_A)]$, where $R_{SA}$ represents the thermal resistance from the stator to the ambient environment, where $R_{SC}$ represents the thermal resistance from the stator to the motor case, where $R_{CA}$ represents the thermal resistance from case to ambient, and where $k_0$, $k_T$, $T_S$, and $T_A$ are as above. Such determination can include consideration of, for example, a thermal resistance from winding to stator $R_{WS}$ and a thermal resistance from rotor to stator $R_{RS}$. For some motor types, such as a permanent magnet synchronous motor (PMSM), a simplified model may be used where a parameter such as $R_{RS}$ need not be explicitly included in the determination.

Figure 1:
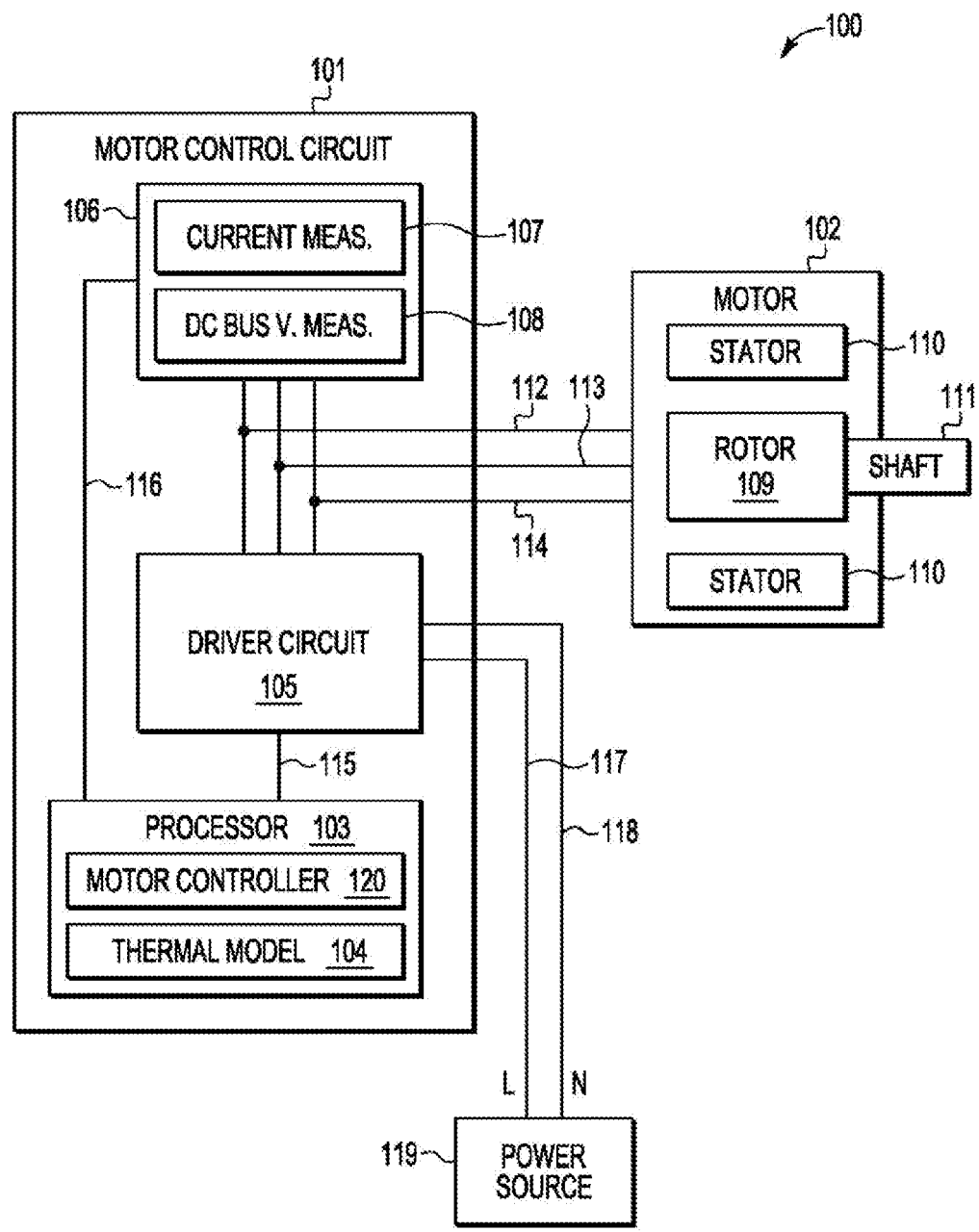
FIG. 1 is a block diagram illustrating an electric motor system comprising a motor control circuit utilizing a thermal model in accordance with at least one embodiment.

FIG. 1 is a block diagram illustrating an electric motor system comprising a motor control circuit utilizing a thermal model in accordance with at least one embodiment. The electric motor system 100 comprises motor control circuit 101, motor 102, and power source 119. Motor control circuit 101 comprises processor 103, driver circuit 105, and measurement circuits 106. Processor 103 comprises thermal model 104. Measurement circuits 106 comprise current measurement circuit 107 and direct current (DC) bus voltage measurement circuit 108. Motor 102 comprises rotor 109, stator 110, and shaft 111. Shaft 111 is mechanically coupled to rotor 109. Windings are disposed within motor 102. For example, stator windings may be provided to create a magnetic field in stator 110. As another example, rotor windings may be provided to create a magnetic field in rotor 109.

Motor control circuit 101 is connected to motor 102 via conductors 112, 113, and 114. Conductors 112, 113, and 114 are connected to outputs of driver circuit 105 and to inputs of measurement circuits 106. Measurement circuits 106 are connected to processor 103 via connection 116 to provide measurements from measurement circuits 106 to processor 103. Processor 103 is connected to driver circuit 105 via connection 115 to allow processor 103 to control driver circuit 105. Power source 119 is connected to driver circuit 105 via line conductor 117 and neutral conductor 118 to provide power for driver circuit 105 to apply to motor 102.

Measurement circuits 106 can obtain measurements of parameters of motor 102. Current measurement circuit 107 can obtain a current measurement of current provided to motor 102. DC bus voltage measurement circuit 108 can obtain a voltage measurement of voltage provided to motor 102. Each of current measurement circuit 107 and DC bus voltage measurement circuit 108 can obtain a plurality of measurements, for example, with respect to the plurality of conductors 112, 113, and 114. Thus, for example, single phase and multiple phase (e.g., three-phase) motors can be controlled. Measurements can be, for example, complex measurements, which can include a direct component and a quadrature component sampled 90 degrees of phase away from the direct component. Magnetic components of motor 102, such as rotor 109 and stator 110, can include permanent magnetic components and electromagnetic components or entirely electromagnetic components.

Electric motor system 100 can be implemented to control operation of various motor types, such as DC permanent magnet synchronous motors (PMSM), brushless DC (BLDC) motors, switched reluctance (SR) motors, AC induction motors (ACIM), and other motor types. Different control instructions can be executed by processor 103 to accommodate different motor types, for example, using field oriented control (FOC), voltage-over-frequency (V/Hz), and slip control. Different components can be used in driver circuit 105 to drive different motor types. For example, components compatible with voltages of different polarities can be used to implement driver circuit 105 for AC motors. Different components can be used in measurement circuits 106 to measure currents and voltages of different motor types. In the case of an alternating current (AC) motor, measurement circuits 106 can be capable of measuring AC signals. As an example, an AC bus voltage measurement circuit may be used in place of DC bus voltage measurement circuit 108. In accordance with at least one embodiment, DC bus voltage measurement circuit 108 may be implemented generally as a voltage measurement circuit not specifically limited to DC or AC voltage measurement.

Figure 2:
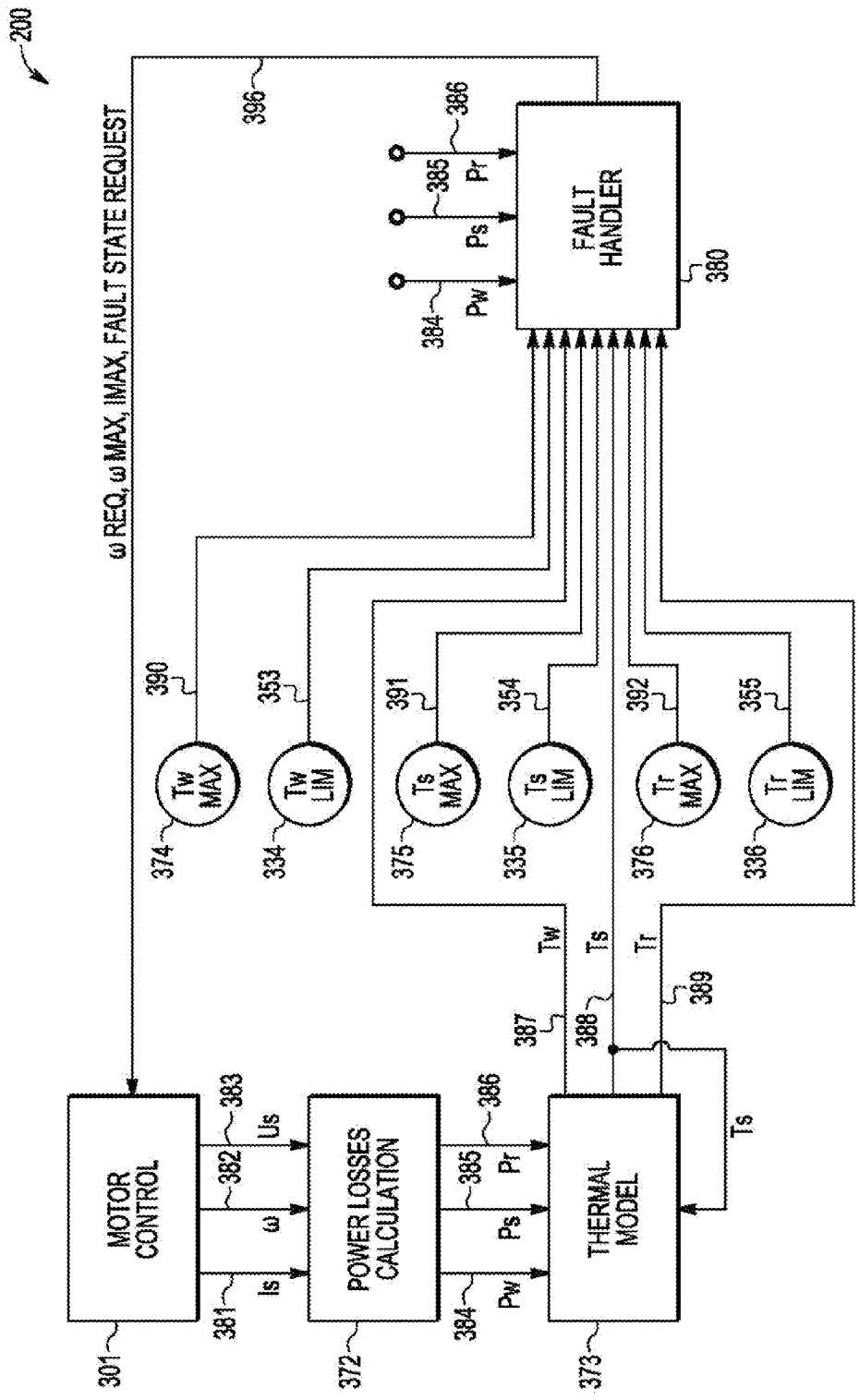
FIG. 2 is a block diagram illustrating a control system for an electric motor for providing thermal management of an electric motor according to designated parameters in accordance with at least one embodiment.

FIG. 2 is a block diagram illustrating a control system for an electric motor for providing thermal management of an electric motor according to designated parameters in accordance with at least one embodiment. Control system 200 comprises motor control block 301, power losses calculation block 372, thermal model block 373, maximum winding temperature register 374, winding temperature limitation register 334, maximum stator temperature register 375, stator temperature limitation register 335, maximum rotor temperature register 376, rotor temperature limitation register 336, and fault handler block 380. Motor control block 301 receives a requested angular velocity signal $\omega_{(EST)}$, a maximum angular velocity signal $\omega_{MAX}$, a maximum current signal $I_{MAX}$, and a fault state request signal from outputs 396 of fault handler block 380. Based on the input signals, motor control block 301 provides a stator current signal $I_s$ to power losses calculation block 372 at output 381. Motor control block 301 provides an angular velocity signal $\omega$ to power losses calculation block 372 at output 382. Motor control block 301 provides a stator voltage signal $U_s$ to power losses calculation block 372 at output 383. Based on inputs from motor control block 301, power losses calculation block 372 provides a winding power losses signal $P_w$ to thermal model block 373 and to fault handler block 380 at output 384, a stator power losses signal $P_s$ to thermal model block 373 and to fault handler block 380 at output 385, and a rotor power losses signal $P_r$ to thermal model block 373 and to fault handler block 380 at output 386.

Thermal model block 373 provides a calculated winding temperature $T_w$ to fault handler block 380 at output 387, a calculated stator temperature $T_s$ to fault handler block 380 and back to thermal model block 373 at output 388, and a calculated rotor temperature $T_r$ to fault handler block 380 at output 389. It will be appreciated that the calculated temperatures are estimates based upon corresponding models. Maximum winding temperature register 374 provides a maximum winding temperature $T_{wmax}$ to fault handler 380 at output 390. Maximum stator temperature register 375 provides a maximum stator temperature $T_{smax}$ to fault handler block 380 at output 391. Maximum rotor temperature register 376 provides a maximum rotor temperature $T_{rmax}$ to fault handler block 380 at output 392. Winding temperature limitation register 334 provides a winding temperature limitation $T_{wlim}$ to fault handler 380 at output 353. Stator temperature limitation register 335 provides a stator temperature limitation $T_{Slim}$ to fault handler 380 at output 354. Rotor temperature limitation register 336 provides a rotor temperature limitation $T_{rlim}$ to fault handler 380 at output 355. These various values can be empirically determined and stored at their respective registers.

By being provided with maximum temperatures and estimated temperatures of components of an electric motor, fault handler 380 is able to compare the estimated temperatures to the maximum temperatures and initiate action to prevent the maximum temperatures from being exceeded. By being provided with temperature limitations and estimated temperatures of components of an electric motor, fault handler 380 is able to evaluate the estimated temperatures with respect to the temperature limitations and modify the operation of the electric motor. Such modification can occur well before the electric motor components approach the maximum temperatures. Such modification need not be limited to controlling the temperatures of electric motor components, but can also include improving efficiency, managing torque, managing power, managing speed, and for other functions. Knowledge of trends of estimated temperatures of electric motor components can be used to take preemptive action. Such preemptive action was not possible with previous simple temperature switch technologies, as a simple temperature switch does not provide an advance indication that it is about to switch. By providing a comprehensive thermal model of all relevant motor components, thermal model 373 can provide fault handler 380 with real-time information useful for managing electric motor performance consistent with any desired thermal performance profile or other thermal criteria.

Figure 3:
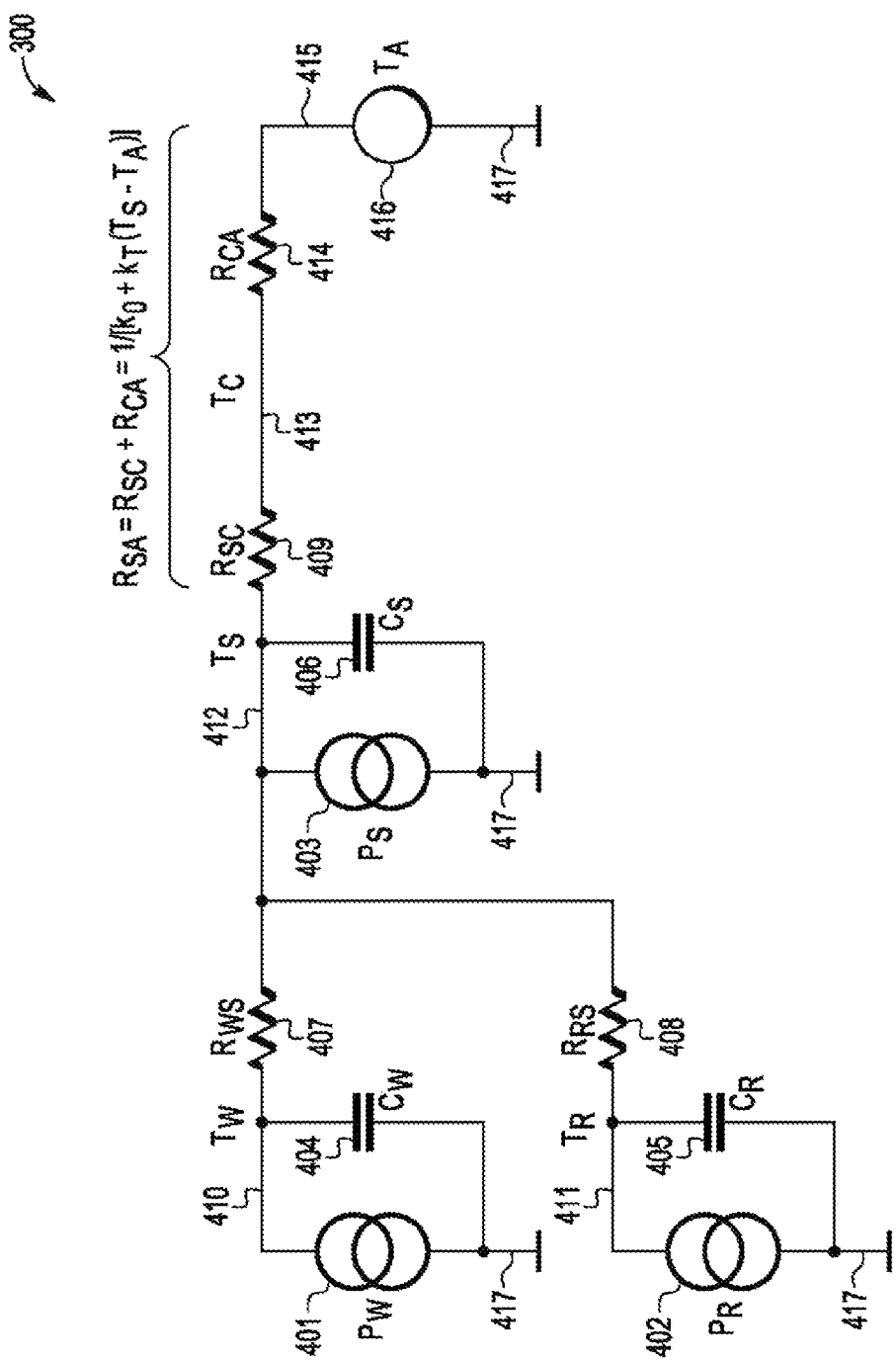
FIG. 3 is a schematic diagram illustrating a thermodynamic model of electric motor elements (including a winding, a rotor, and a stator) and an ambient environment in accordance with at least one embodiment.

FIG. 3 is a schematic diagram illustrating a thermodynamic model of electric motor elements (including a winding, a rotor, and a stator) and an ambient environment in accordance with at least one embodiment. While FIG. 3 illustrates a general form of a thermodynamic model, FIG. 6 will be described later below to illustrate a simplified form of a thermodynamic model applicable to at least one motor type. The thermodynamic model of FIG. 3 can be usefully applied to a wide variety of motor types, including AC induction motors, DC brushless motors, switched reluctance motors, permanent magnet synchronous motors, and the like. Thermodynamic model 300 comprises thermal current source 401, thermal current source 402, thermal current source 403, thermal capacitance 404, thermal capacitance 405, thermal capacitance 406, thermal resistance 407, thermal resistance 408, thermal resistance 409, thermal potential 410, thermal potential 411, thermal potential 412, thermal potential 413, thermal resistance 414, thermal potential 415, thermal voltage source 416, and thermal ground potential 417. The elements of thermodynamic model 300, while shown as electrical symbols, represent analogous thermodynamic elements of thermodynamic model 300. Thermal current source 401 represents power losses in the motor winding, represented as $P_W$. Thermal current source 402 represents power losses in the rotor, represented as $P_E$. Thermal current source 403 represents power losses in the stator, represented as $P_S$. Thermal capacitance 404 represents the motor winding thermal capacity, represented as $C_W$. Thermal capacitance 405 represents the rotor winding thermal capacity, represented as $C_R$. Thermal capacitance 406 represents the stator thermal capacity, represented as $C_S$. Thermal resistance 407 represents the thermal resistance from the winding to the stator, represented as $R_{WS}$. Thermal resistance 408 represents the thermal resistance from the rotor to the stator, represented as $R_{RS}$. Thermal resistance 409 represents the thermal resistance from the stator to the motor case, represented by $R_{SC}$. Thermal potential 410 represents the motor winding temperature, represented as $T_w$. Thermal potential 411 represents the rotor temperature (e.g., the temperature of the rotor of the ferromagnetic circuit), represented as $T_R$. Thermal potential 412 represents the stator temperature (e.g., the temperature of the stator of the ferromagnetic circuit), represented as $T_S$. Thermal potential 413 represents the motor case temperature, represented as $T_C$. Thermal resistance 414 represents the thermal resistance from the motor case to the ambient environment, represented as $R_{CA}$. Thermal potential 415 represents the ambient temperature, represented as $T_A$. Thermal voltage source 416 represents the thermal reservoir of the ambient environment that provides the ambient temperature. Thermal ground potential 417 represents a thermodynamic reference potential to which the thermodynamic elements are referenced.

A first terminal of thermal current source 401 is connected to thermal potential 410. A second terminal of thermal current source 401 is connected to thermal ground potential 417. A first terminal of thermal capacitance 404 is connected to thermal potential 410. A second terminal of thermal capacitance 404 is connected to thermal ground potential 417. A first terminal of resistor 407 is connected to thermal potential 410. A second terminal of thermal resistance 407 is connected to thermal potential 412.

A first terminal of thermal current source 402 is connected to thermal potential 411. A second terminal of thermal current source 402 is connected to thermal ground potential 417. A first terminal of thermal capacitance 405 is connected to thermal potential 411. A second terminal of thermal capacitance 405 is connected to thermal ground potential 417. A first terminal of thermal resistance 408 is connected to thermal potential 411. A second terminal of thermal resistance 408 is connected to thermal potential 412.

A first terminal of thermal current source 403 is connected to thermal potential 412. A second terminal of thermal current source 403 is connected to thermal ground potential 417. A first terminal of thermal capacitance 406 is connected to thermal potential 412. A second terminal of thermal capacitance 406 is connected to thermal ground potential 417. A first terminal of thermal resistance 409 is connected to thermal potential 412. A second terminal of thermal resistance 409 is connected to thermal potential 413. A first terminal of thermal resistance 414 is connected to thermal potential 413. A second terminal of thermal resistance 414 is connected to thermal potential 415. A first terminal of thermal voltage source 416 is connected to thermal potential 415. A second terminal of thermal voltage source 416 is connected to thermal ground potential 417.

In operation, temperatures, such as the winding temperature $T_W$, the rotor temperature $T_R$, the stator temperature $T_S$, and the motor case temperature $T_C$ can be calculated based on other parameters included within the model, such as the power values, the thermal capacitance values, the thermal resistance values, and the ambient temperature $T_A$ shown in FIG. 3. As such, power inputs to the system, which can come from electric power applied to the motor, are modeled as thermal current sources. Heat storage capacities of motor components are modeled as thermal capacitances. Heat transfers through finite thermal conductivities are modeled by thermal resistances.

The difference between the electrical power applied to the motor and the mechanical power provided by the motor can be measured based on the electrical parameters of the motor, and such measurements may be supplemented by other measurements, such as from rotary shaft position and rotation encoders or resolvers. That difference between input power and output power of the motor represents power dissipated in the motor as heat. As thermal energy of the thermal capacitances of the motor components increases, the temperature of the motor components increases. As local temperatures increase, the thermal potentials between the warmer motor components and other nearby cooler motor components increases, the heat flows from the warmer motor components to the cooler motor components, spreading the heat to the to cooler motor components and increasing their temperatures. As illustrated in FIG. 3, power is applied to motor components on the left, heat flows from left to right through internal motor components to the motor case, then heat flows from the motor case into the ambient environment. By using temperature measuring instrumentation to measure the temperatures of motor components during operation in a laboratory, parameter values characteristic of an electric motor can be empirically determined. The empirically determined values can be adjusted to compensate for any measurement shortcomings by selecting values that best dynamically track measurements during motor operation over time. As such electric motors are mass-produced, characteristics of individual specimens of a electric motor tend to conform to the characteristics of the tested specimen, allowing static parameter values of the thermal model to be programmed at a factory where a product incorporating the electric motor system is manufactured. Specific equations related to modeling the temperature information, such temperature TC, will be discussed in greater detail below.

Figure 4:
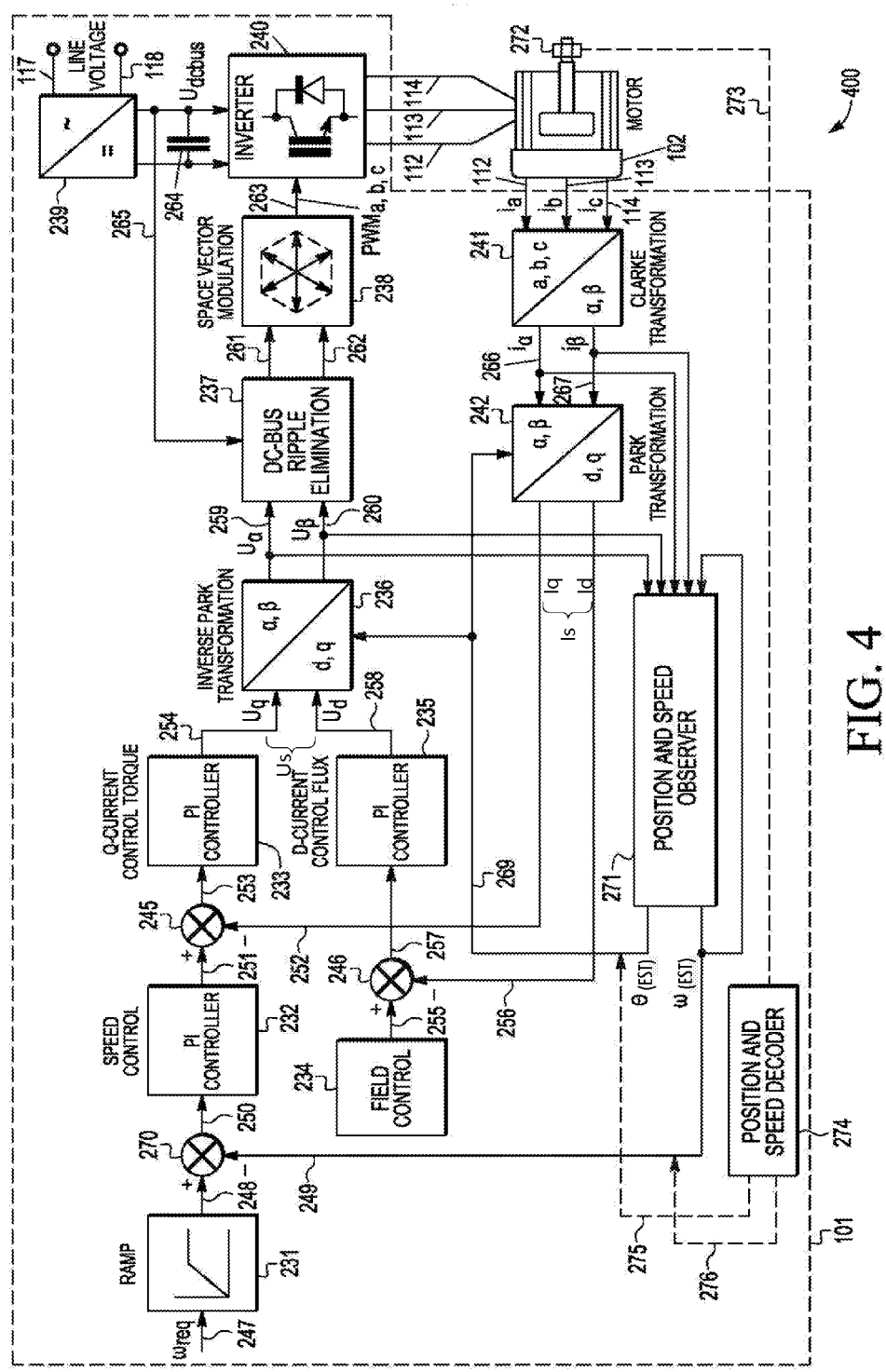
FIG. 4 is a block diagram illustrating an electric motor system comprising control system elements for providing thermal management of an electric motor in accordance with at least one embodiment.

FIG. 4 is a block diagram illustrating an electric motor system comprising control system elements for providing thermal management of an electric motor in accordance with at least one embodiment. Electric motor system 400 comprises motor control circuit 101 and motor 102 of FIG. 1. Motor control circuit 101 comprises ramp block 231, speed control block 232, quadrature-current (Q-current) control torque block 233, field control block 234, direct-current (D-current) control flux block 235, inverse Park transformation block 236, direct-current (DC) bus ripple elimination block 237, space vector modulation block 238, alternating-current-to-direct-current (AC-to-DC) power conversion block 239, inverter block 240, Clarke transformation block 241, Park transformation block 242, position and speed observer block 271, and position and speed decoder block 274.

During operation, ramp block 231 receives a requested angular velocity signal $\omega_{REQ}$ at input 247 and provides output 248 to adjustment block 270. Adjustment block 270 receives an estimated angular velocity signal $\omega_{(EST)}$ at output 249 of tracking observer block 244. Adjustment block 270 subtracts $\omega_{REQ}$ from $\omega_{REQ}$ to provide an angular velocity control signal to speed control block 232 at output 250. Speed control block 232 may be implemented, for example, using a proportional integral (PI) controller. Speed control block 232 provides an output signal to adjustment block 245 at output 251. Adjustment block 245 receives a signal from Park transformation block 242 at output 252. Adjustment block 245 subtracts the signal at output 252 from the signal at output 251 to provide a signal at output 253 to Q-current control torque block 233. Q-current control torque block 233 may be implemented, for example, using a PI controller. Q-current control torque block 233 provides a signal $u_q$ at output 254 to inverse Park transformation block 236.

Field control block 234 provides a field control signal to adjustment block 246 at output 255. Adjustment block 246 receives a signal from Park transformation block 242 at output 256. Output 256 corresponds to the $I_{sd}$ component of $I_s$ output 381 of FIG. 5, and output 252 corresponds to the $I_{sq}$ component of $I_s$ output 381 of FIG. 5. Adjustment block 246 subtracts the signal at output 256 from the field control signal at output 255 and provides a signal to D-current control flux block 235 at output 257. D-current control flux block 235 may be implemented, for example, using PI controller. D-current control flux block 235 provides a signal $u_d$ at output 258 to inverse Park transformation block 236. Output 258 corresponds to the $U_{sd}$ component of $U_s$ output 383 of FIG. 5, and output 254 corresponds to the $U_{sq}$ component of $U_s$ output 383 of FIG. 5. Inverse Park transformation block 236 provides a signal $u_\alpha$ to DC bus ripple elimination block 237 and to position and speed observer block 271 at output 259 and a signal $u_\beta$ to DC bus ripple elimination block 237 and to position and speed observer block 271 at output 260. DC bus ripple elimination block 237 receives a signal $U_{dcbus}$ from output 265 of AC-to-DC power conversion block 239. DC bus ripple elimination block 237 provides compensation for ripple on the signal $U_{dcbus}$ and provides signals at outputs 261 and 262 to space vector modulation block 238. Space vector modulation block 238 provides pulse width modulation (PWM) motor drive signals $PWM_{a,b,c}$ to inverter block 240 at outputs 263. A line conductor 117 provides a line voltage to AC-to-DC power conversion block 239. A neutral conductor 118 provides a neutral voltage to AC-to-DC power conversion block 239. AC-to-DC power conversion block 239 provides DC voltages to inverter block 240 at outputs 264 and 265. Inverter block 240 provides motor drive signals at conductors 112, 113, and 114 to electric motor 102 according to PWM motor drive signals $PWM_{a,b,c}$.

Conductors 112, 113, and 114 from electric motor 102 provide signals to inputs of Clarke transformation block 241. Clarke transformation block 241 provides signals $i_\alpha$ and $i_\beta$ to Park transformation block 242 and to position and speed observer block 271 at outputs 266 and 267. Park transformation block 242 receives estimated phase angle signal $\theta_{(EST)}$ at output 269 from tracking observer block 244. Park transformation block 242 provides a d signal at output 256 to adjustment block 246 and a q signal at output 252 to adjustment block 245. Position and speed observer block 271 provides estimated angular velocity signal $\omega_{(EST)}$ to adjustment block 270 and to position and speed observer block 271 at output 249. Position and speed observer block 271 provides estimated phase angle signal $\theta_{(EST)}$ at output 269 to inverse Park transformation block 236 and to Park transformation block 242.

In accordance with at least one embodiment, motor 102 may be fitted with an shaft position sensor 272, such as an encoder or resolver. For example, an encoder may use an unambiguous code, such as a Gray code, to optically encode shaft position. Changes of code values can also be used to obtain an indication of shaft motion, such as rotational velocity. As another example of a shaft position sensor, a resolver may use electromagnetic sensing elements, which may be arranged orthogonally with respect to each other, to obtain an indication of shaft position. Changes in shaft position may be used to obtain an indication of shaft motion, such as rotational velocity. Shaft position sensor 272 is connected to position and speed decoder block 274. Position and speed decoder block 274 can provide output signals 275 and 276, which may be used in place of or to adjust the estimated phase angle signal $\theta_{(EST)}$ at output 269 and the estimated angular velocity signal $\omega_{(EST)}$ at output 249. Embodiments of the electric motor system of FIG. 3 may be adapted to control motors of various motor types, such as brushless DC (BLDC) motors, switched reluctance (SR), AC induction motors (ACIM), DC permanent magnet synchronous motors (PMSM), etc.

Figure 5:
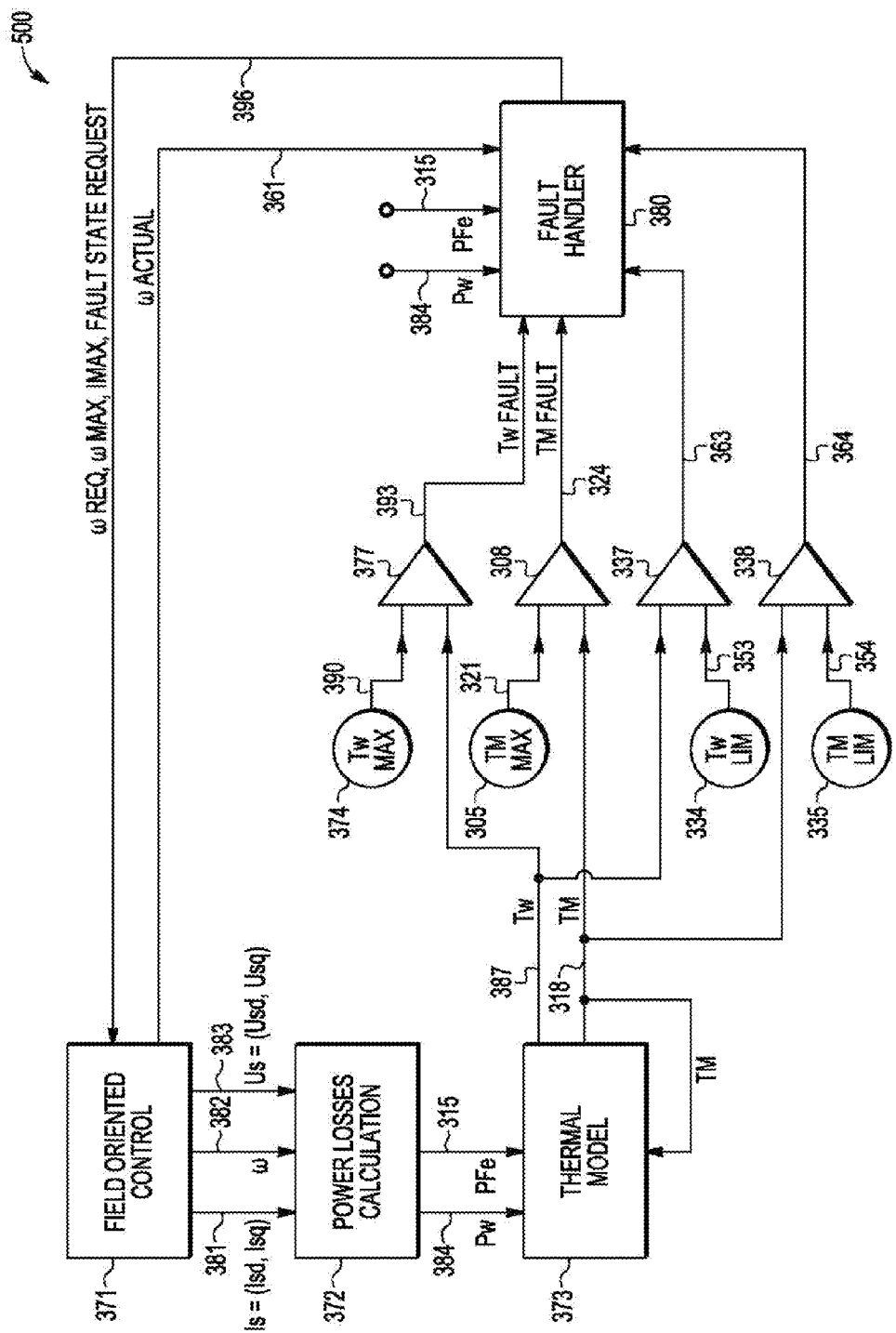
FIG. 5 is a block diagram illustrating a control system for an electric motor for providing thermal management of an electric motor according to designated parameters in accordance with at least one embodiment.

FIG. 5 is a block diagram illustrating a control system for an electric motor for providing thermal management of an electric motor according to designated parameters in accordance with at least one embodiment. The control system of FIG. 5 varies from the control system of FIG. 2 in that the control system of FIG. 5 is simpler, utilizing a motor mass maximum temperature and a motor mass limitation temperature instead of separate stator and rotor maximum and limitation temperatures. The control system of FIG. 5 also utilizes comparators to indicate conditions based on the comparisons rather than allowing more sophisticated evaluation in fault handler 380.

Control system 500 comprises field oriented control (FOC) block 371, power losses calculation block 372, thermal model block 373, maximum winding temperature register 374, maximum motor mass temperature register 305, winding temperature limitation register 334, motor mass temperature limitation register 335, winding maximum temperature comparator 377, motor mass maximum temperature comparator 308, winding limitation temperature comparator 337, motor mass limitation temperature comparator 338, and fault handler block 380. FOC may be referred to as a vector control.

During operation, FOC block 371 receives a requested angular velocity signal $\omega_{(EST)}$, a maximum angular velocity signal $\omega_{max}$, a maximum current signal $I_{max}$, and a fault state request signal from outputs 396 of fault handler block 380. FOC block 371 provides an actual angular velocity signal $\omega_{actual}$ to fault handler block 380 via output 361. FOC block 371 provides a stator current signal $I_s$, comprising a direct stator current component $I_{sd}$ and a quadrature stator current component $I_{sq}$, to power losses calculation block 372. FOC block 371 provides an angular velocity signal $\omega$ to power losses calculation block 372 at output 382. FOC block 371 provides a stator voltage signal $U_s$, comprising direct stator voltage component $U_{sd}$ and quadrature stator voltage component $U_{sq}$, to power losses calculation block 372 at output 383. Power losses calculation block 372 provides a winding power losses signal $P_w$ to thermal model block 373 and to fault handler block 380 at output 384 and a motor ferromagnetic circuit power losses signal $P_{Fe}$ to thermal model block 373 and to fault handler block 380 at output 315.

Thermal model block 373 provides a calculated winding temperature $T_w$ to winding maximum temperature comparator 377 and to winding limitation temperature comparator 337 at output 387 and a motor mass temperature $T_M$ to motor mass maximum temperature comparator 308, to motor mass limitation temperature comparator 338, and back to thermal model block 373 at output 318. Maximum winding temperature register 374 provides a maximum winding temperature $T_{wmax}$ to winding maximum temperature comparator 377 at output 390. Maximum motor mass temperature register 305 provides a maximum motor mass temperature $T_{Mmax}$ to motor mass maximum temperature comparator 308 at output 321. Winding limitation temperature register 334 provides a winding limitation temperature $T_{wlim}$ to winding limitation temperature comparator 337 at output 353. Motor mass limitation temperature register 335 provides a motor mass limitation temperature $T_{Mlim}$ to motor mass limitation comparator 338 at output 354.

Winding maximum temperature comparator 377 provides a winding temperature fault indication signal $T_w$_fault to fault handler block 380 at output 393. Motor mass maximum temperature comparator 308 provides a motor mass temperature fault indication signal $T_M$_fault to fault handler block 380 at output 324. Winding limitation temperature comparator 337 provides a winding temperature limitation indication signal $T_w$_limitation to fault handler block 380 at output 363. Motor mass limitation temperature comparator 338 provides a motor mass temperature limitation indication signal $T_M$_limitation to fault handler block 380 at output 364.

By comparing the estimated winding temperature and the estimated motor mass temperature to respective maximum and limitation values, comparators 377, 308, 337, and 338 provide signals to allow fault handler 380 to take action both to avoid maximum winding and motor mass temperatures and to prevent motor damage and other hazards if maximum winding or motor mass temperature is reached. In addition to the maximum values, a plurality of limitation values can be provided for comparison by using additional registers and comparators.

Figure 6:
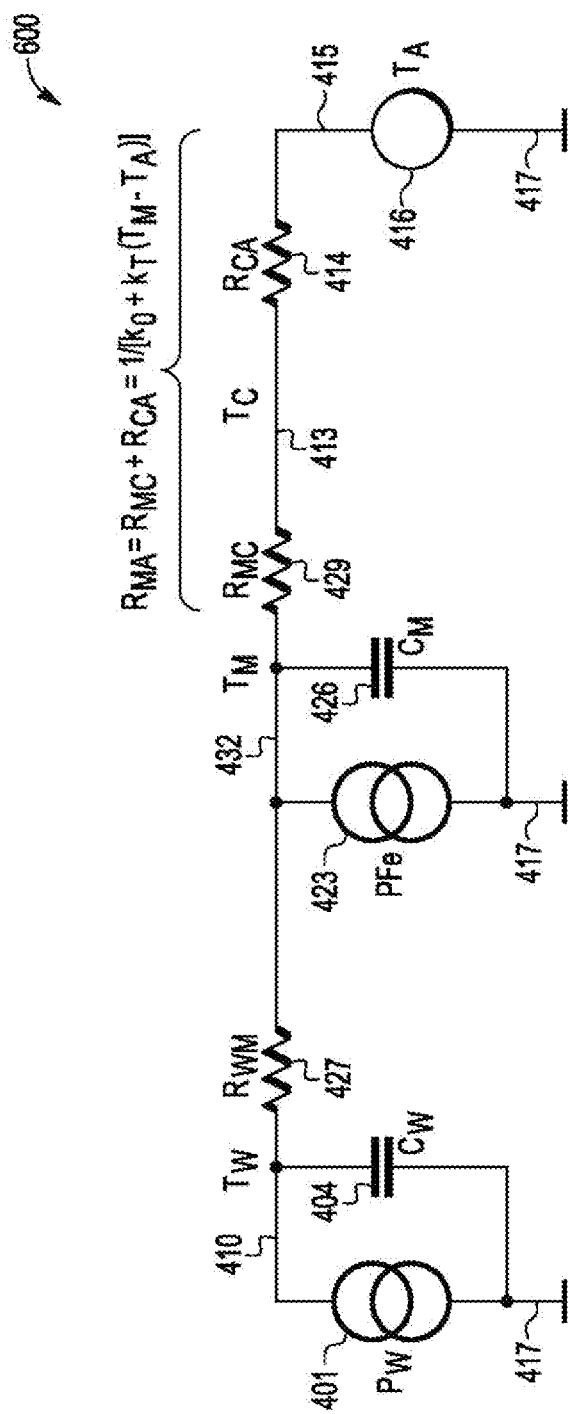
FIG. 6 is a schematic diagram illustrating a thermodynamic model of electric motor elements (including a winding and a motor mass) and an ambient environment in accordance with at least one embodiment.

FIG. 6 is a schematic diagram illustrating a thermodynamic model of electric motor elements (including a winding and a motor mass) and an ambient environment in accordance with at least one embodiment. The thermodynamic model of FIG. 6 differs from the thermodynamic model of FIG. 3 in that the thermodynamic model of FIG. 6 is a simplified model characterizing an electric motor thermally with respect to a motor winding, a motor mass, a motor case, and an ambient environment. Thermodynamic model 600 comprises thermal current source 401, thermal current source 423, thermal capacitance 404, thermal capacitance 426, thermal resistance 427, thermal resistance 429, thermal potential 410, thermal potential 432, thermal potential 413, thermal resistance 414, thermal potential 415, thermal voltage source 416, and thermal ground potential 417.

As described above, the elements of thermodynamic model 600, while shown as electrical symbols, represent analogous thermodynamic elements of thermodynamic model 600. Thermal current source 401 represents power losses in the motor winding, represented as $P_W$. Thermal current source 423 represents power losses in the motor mass, represented as $P_M$. Thermal capacitance 404 represents the motor winding thermal capacity, represented as $C_W$. Thermal capacitance 426 represents the motor mass thermal capacity, represented as $C_M$. Thermal resistance 427 represents the thermal resistance from the winding to the motor mass, represented as $R_{WM}$. Thermal resistance 429 represents the thermal resistance from the motor mass to the motor case, represented by $R_{MC}$. Thermal potential 410 represents the motor winding temperature, represented as $T_w$. Thermal potential 432 represents the motor mass temperature, represented as $T_M$. Thermal potential 413 represents the motor case temperature, represented as $T_C$. Thermal resistance 414 represents the thermal resistance from the motor case to the ambient environment, represented as $R_{CA}$. Thermal potential 415 represents the ambient temperature, represented as $T_A$. Thermal voltage source 416 represents the thermal reservoir of the ambient environment that provides the ambient temperature. Thermal ground potential 417 represents a thermodynamic reference potential to which the thermodynamic elements are referenced.

A first terminal of thermal current source 401 is connected to thermal potential 410. A second terminal of thermal current source 401 is connected to thermal ground potential 417. A first terminal of thermal capacitance 404 is connected to thermal potential 410. A second terminal of thermal capacitance 404 is connected to thermal ground potential 417. A first terminal of thermal resistance 427 is connected to thermal potential 410. A second terminal of thermal resistance 427 is connected to thermal potential 432. A first terminal of thermal current source 403 is connected to thermal potential 412. A second terminal of thermal current source 423 is connected to thermal ground potential 417. A first terminal of thermal capacitance 426 is connected to thermal potential 432. A second terminal of thermal capacitance 426 is connected to thermal ground potential 417. A first terminal of thermal resistance 429 is connected to thermal potential 432. A second terminal of thermal resistance 429 is connected to thermal potential 413. A first terminal of thermal resistance 414 is connected to thermal potential 413. A second terminal of thermal resistance 414 is connected to thermal potential 415. A first terminal of thermal voltage source 416 is connected to thermal potential 415. A second terminal of thermal voltage source 416 is connected to thermal ground potential 417. In operation, an electric motor can be characterized according to a thermal model, such as that of FIG. 3 or FIG. 6, and such characterization can be used to operate the motor, as described in greater detail below with respect to FIG. 7.

Figure 7:
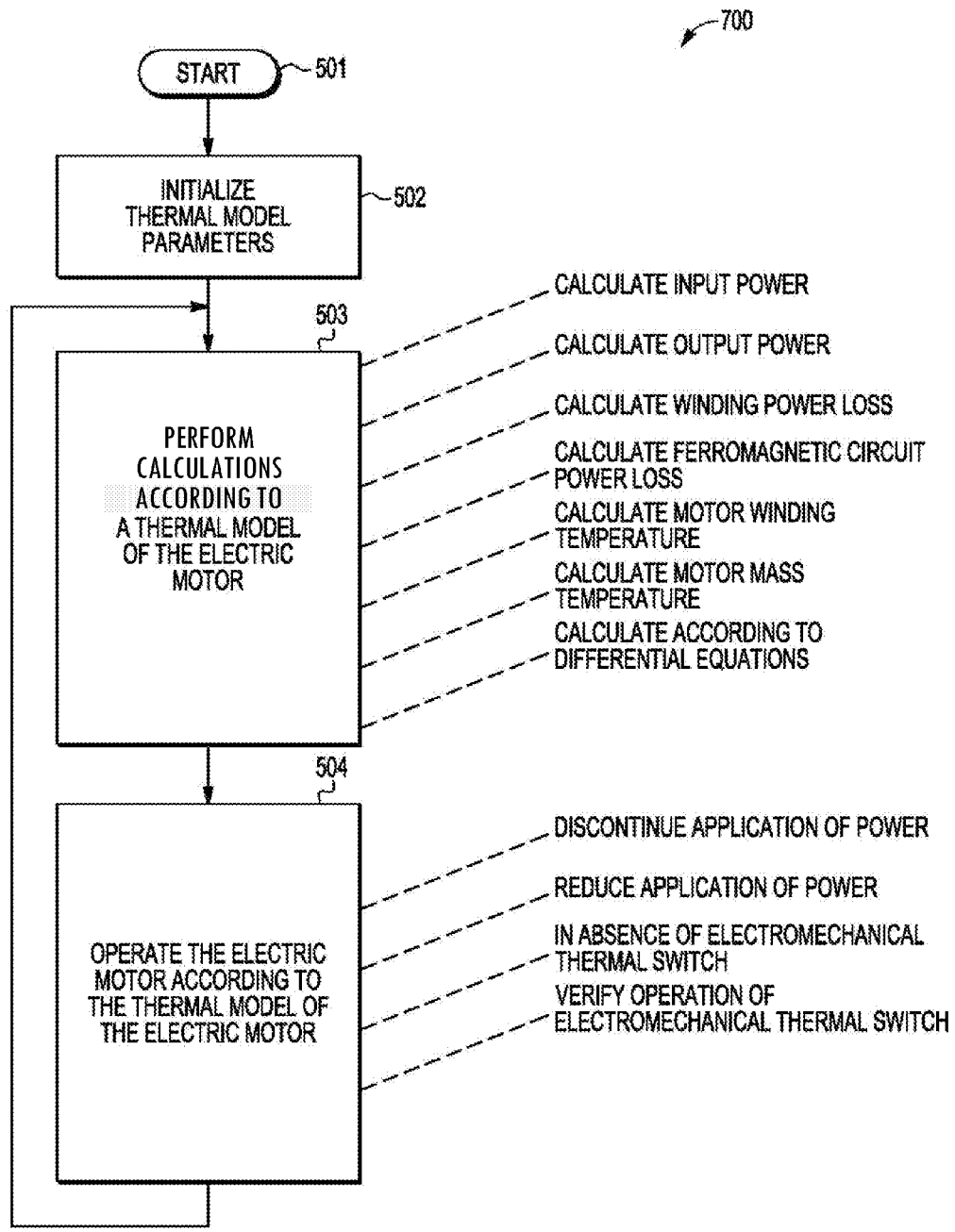
FIG. 7 is a flow diagram illustrating a method for thermal management of a motor in accordance with at least one embodiment.

FIG. 7 is a flow diagram illustrating a method for thermal management of a motor in accordance with at least one embodiment. Method 700 begins at block 501 and continues to block 502. At block 502, the thermal model parameters are initialized, such as by storing empirically determined values at storage locations. From block 502, method 700 continues to block 503.

At block 503, calculations are performed according to a thermal model of the electric motor. As examples, the calculation of the thermal model of the electric motor can include calculating input power, calculating output power, calculating winding power loss, calculating ferromagnetic circuit power loss, calculating motor winding temperature, calculating motor mass temperature, and performing the calculations according to differential equations. Such calculations can be used, for example, to determine temperatures of motor components, such as a winding, a stator, a rotor, a motor mass, and a motor case. By determining such temperatures, important motor conditions, such as overloading and overheating can be identified. From block 503, method 700 can continue to block 504. The calculations of block 503 correspond to mathematical operations performed in blocks shown in other FIGS., such as FIGS. 2, 4, and 5. For example, as shown in blocks 372 and 373 of FIGS. 2 and 5, power loss calculation can be performed in block 372 and temperature calculation can be performed in block 373.

At block 504, the electric motor is operated according to the information derived from the thermal model of the electric motor. As examples, the operation of the electric motor can include, in response to calculated temperatures, discontinuing application of power, reducing application of power, operating the electric motor in absence of an electromechanical thermal switch, and verifying operation of an electromechanical thermal switch. From block 504, method 700 returns to block 503 to iteratively continue method 700. As method 700 continues, motor current, motor angular velocity, and motor voltage can continue to be measured and applied to the thermal model. The difference between electrical power applied to the motor and mechanical power provided by the motor can be used to determine power dissipated by the motor, which heats the motor. Heat flow from the motor windings, through other motor components, to the ambient environment can be modeled on an ongoing basis to provide a mathematically derived dynamic internal temperature measurement of the motor in response to actual motor operation.

As an example, in a super-safe application, redundant overtemperature protection can be provided. For example, if an indication based on a thermal model of motor operation indicates that an electromechanical thermal switch should have changed state but no switching of the switch is detected, an indication that the electromechanical thermal switch has failed may be generated, and the motor control system may be placed in a mode to adjust operation based on the switch failure. As another example, if a state change of the electromechanical thermal switch is detected, but no indication of a corresponding estimated temperature is provided according to the thermal model, an indication that a failure, which may be a failure of the electromechanical thermal switch or a failure of an input upon which the thermal model depends, may be generated, and the motor control system may be placed in a mode to adjust operation based on the failure. As examples, the motor may be stopped or a more conservative model tolerant of the indicated failure may be applied.

In accordance with at least one embodiment, a motor control circuit comprising measurement circuits, a processor, and a motor driver circuit provides motor thermal management based on electrical signals present at the motor control circuit. The processor can execute instructions to provide thermal mathematical model calculation. Such a technique can avoid issues with hardware protection in the motor, such as the need for an electromechanical thermal switch in the motor, which is being used now. Such a technique can solve problems associated with monitoring motor temperature and protecting motor against overload condition and overheating. As examples, sole reliance on an electromechanical thermal switch in the motor is expensive, of limited reliability, and without a technique for verifying proper operation of the switch on an ongoing basis.

In accordance with at least one embodiment, a solution for monitoring motor temperature and protecting motor against overload condition and overheating is provided. A thermal mathematical model for an electric motor is calculated in runtime. The temperature is estimated based on measurement of different physical quantities than temperature. As an example, motor currents are measured, and the motor voltages are measured or calculated. Monitoring the motor temperature and detecting the overload condition can satisfy safety requirements for products with motor drives that are to be certified according to the international standards, for example, International Electrotechnical Commission (IEC) standards, such as IEC 60730, IEC 60335, and others.

In accordance with at least one embodiment, motor overtemperature detection can be provided. However, unlike an electromechanical thermal switch, at least one embodiment is not limited to a simple binary (e.g., not over temperature limit vs. over temperature limit) determination of temperature but can provide estimates of temperature that can be updated over time and that can span a range from the ambient temperature upward to an elevated temperature. In accordance with at least one embodiment, the elevated temperature can be an upper temperature limit, for example, a temperature in response to which the application of power to the motor is discontinued to prevent any further temperature rise. In accordance with at least one embodiment, the elevated temperature may be below an upper temperature limit, for example, a temperature in response to which a modification of at least one motor parameter can be made, allowing continued operation of the motor according to the at least one modified motor parameter. As an example, the application of power can be continued, but reduced, allowing continued operation of the motor at reduced power.

According to at least one embodiment, significant cost reduction can be achieved through elimination of an electromechanical thermal switch and system reliability can be increased by not relying on a moving part, like an electromechanical thermal switch, which can fail. Motor thermal management based on calculation of a thermal mathematical model of the system can be based on measurements of analog signals from the system with periodic checking whether the measurements are correct or not. Motor thermal management according to a thermal model can be used to predict thermal behavior of the motor and to respond to the thermal behavior accordingly, for example, either by reacting to a motor overload condition when it occurs or by making preemptive modifications to motor parameter values in anticipation of a future motor condition, such as a future motor overload condition, prior to the occurrence of the future motor condition, based on a trend determined according to the thermal model and the observed motor parameter measurements.

Today, application safety is important for many new motor control systems, for example, for appliances (such as major appliances, also referred to as white goods or whiteware), for industrial applications, and for automotive applications. Examples of standards to which conformance may be sought include IEC 60730 for automatic electrical controls and IEC 60335 for household electrical appliances. As examples, products utilizing a motor control circuit may be certified by certification authorities (e.g., VDE and IMQ in Europe and UL in the USA) to be compliant with standards. Motor overload protection is one of the key requirements of the IEC 60335. It can be important for appliances to include features providing overload protection to be compliant with applicable standards.

An embodiment incorporating a thermal model of an electric motor, such as a permanent magnet synchronous motor (PMSM) or an alternating current (AC) induction motor (ACIM), can offer efficiencies over existing technology and can facilitate comprehensive control of the product as a whole, for example, using and being integrated into a processor-based electronic control system for the product as a whole. Through such integration, information based on the thermal model of the electric motor can be used for other control purposes and, for example, can be communicated by any communication interface provided for the electronic control system. Such information can be used, for example, for user guidance, for manufacturer quality control, for field service, for preventative maintenance, and for other purposes. In accordance with at least one embodiment, control according to the thermal model may be implemented in a motor control circuit comprising a microprocessor executing instructions to perform calculations, with the calculations based on motor parameter measurements and the microprocessor controlling a motor driver circuit to drive the motor according to determinations based on the calculations. In accordance with at least one embodiment, an overheating fault condition can be flexibly defined by software. As examples, the determination of the overheating fault condition can be changed according to changes in system components, changes in standards, environmental changes, aging of system components, and other changes.

In accordance with at least one embodiment, a motor temperature can be estimated from electrical signals (for example, input voltages and currents) based on a thermal mathematical model of an electrical motor that utilizes a linear approximation of nonlinearity of temperature change resulting from heat transfer from a stator to the ambient environment including heat transfer from a motor case to the ambient environment. Motor temperature calculations can include, for example, calculations of the following equations pertaining to a motor winding temperature and a motor mass temperature:

Motor Winding Temperature $T_W(k) \cong T_M(k) + R_{WM} \cdot 1/(\tau_2 \cdot s + 1) \cdot P_W(s)$, where k is a thermal coefficient and s is the complex number frequency for the Laplace transform Motor Mass Temperature $T_M(s) \cong R_{MA}/(\tau_1 \cdot s + 1) \cdot (P_{Fe}(s) + 1/(\tau_2 \cdot s + 1) \cdot P_W(s)) + T_A$ $\tau_2$—time constant for model which corresponds to $R_{WM}$ $C_W$ and can be found by measurement $\tau_1$—time constant for model which corresponds to $R_{MA}$ $C_M$ $\tau_1$—time constant for model is $R_{MA}$ dependent, it can be approximated with:

$\tau_1 = c \cdot R_{MA} = c/[k_0 + k_T \cdot (T_M(k) - T_A)]$ $[(R_{MA} = R_{MC} + R_{CA} = 1/[k_0 + k_T (T_M - T_A)]$, where $R_{CA}$ represents the nonlinear convective, conductive and radiation heat transfers from the motor case.

The c, $k_0$, and $k_T$ can be found by measurement.

To arrive at the values to be calculated according to the above equations to determine temperatures of the motor components, measurements of operational parameters of the motor components, such as the voltage applied, back electromotive force (back EMF), current, angular position, and angular velocity, can be measured. The measurements can be used to obtain mathematical quantities. The mathematical quantities can be utilized in calculating the thermal model of the electric motor and can include, as examples, the following:

DEFINITIONS $T_W$—temperature of the motor winding, as calculated $T_M$—temperature of the motor mass (the ferromagnetic circuit—stator, rotor), as calculated $T_A$—ambient temperature (usually 25° C.) used for the thermal calculations, as provided (e.g., as assumed or as measured)

$T_C$—motor case temperature, as calculated $P_W$—power losses in motor winding, as calculated $P_{Fe}$—power losses in the motor ferromagnetic circuit, as calculated $C_M$—motor mass thermal capacity, as provided (e.g., empirically determined)

$C_W$—motor winding thermal capacity, as provided (e.g., empirically determined)

$R_{WM}$—thermal resistance—motor winding to motor mass, as provided (e.g., empirically determined)

$R_{MC}$—thermal resistance—ferromagnetic circuit to motor case, as provided (e.g., empirically determined)

$R_{CA}$—thermal resistance—motor case to ambient, as provided (e.g., empirically determined)

$R_{MA} = R_{MC} + R_{CA}$—thermal resistance—stator to ambient $k_0$, $k_T$—conductivity model coefficients, which are used to provide a linear approximation to account for the convective, conductive and radiation heat transfers from the motor case to ambient temperature. Such coefficients can be empirically determined, for example, from a test specimen of an electric motor in a laboratory.

$\Delta T = T_M - T_A$—temperature difference between the motor mass temperature and the ambient temperature As the parameter values listed above are obtained, which may be from measurement of dynamic values or from retrieval of stored static values, the parameter values are applied to the calculations of the thermal model to yield calculated parameter values, such as calculated temperatures of motor components, as described mathematically below:

Calculations:

Calculation of the thermal model can include, for example, calculation of the following equations:

$R_W = V_{stop}/I_{stop}$, wherein $V_{stop}$ is the motor voltage at a stop condition and $I_{stop}$ is the motor current at the stop condition $\Delta T = (R_W - R_{WTA}) \cdot k_{rw}{}^{-1}$ $k_{rw}{}^{-1}$ inverse winding resistance thermal coefficient $\Delta T = T - T_A$ [K] temperature drop (difference)

$T_W = (R_W - R_{WTA}) \cdot k_{rw}{}^{-1} + T_A$ $T_M \cong T_W$

As discussed above, the temperature of motor components depends on the amount of input power received. Thermal model input power calculation can include, for example, calculation of the following equations, which are based on a phase invariant transformation of the 3-phase system into d, q plane:

$P_W = 3/2 \cdot R_w \cdot I^2$ $I^2 = I_d{}^2 + I_q{}^2 = I_\alpha{}^2 + I_\beta{}^2$ $R_W = R_{WTA} + k_{rw} \cdot (T_W - T_A)$, wherein $R_{WTA}$ is the winding resistance at 25 degree and $k_{rw}$ thermal coefficient, which can be found by measurement $P_{Fe}(I, \omega) = 3/2 \; R_{Fe} \cdot I^2$ For operations with a negative d current component, the $R_{Fe}$ is a stronger function of frequency than of the current amplitude, so $R_{Fe}$ can be determined as follows:

$R_{Fe} = k_1 \cdot |\omega| + k_2 \cdot \omega^2$ $k_1$, $k_2$ found by measurement Motor power calculations can include, for example, calculations of the following equations, which are based on a phase invariant transformation of the 3-phase system to d, q plane:

$$P_{in} = \frac{3}{2} \cdot [V_d \; V_q] \cdot \begin{bmatrix} I_d \\ I_q \end{bmatrix}$$

$$P_{in} = P_{Mech} + P_w + P_{Fe}$$

$$P_{Mech} = \frac{3}{2} \cdot [V_{BEMF} + (L_d - L_q) \cdot \hat{\omega}_{el} \cdot i_d] \cdot i_q$$

$i_q$—torque current component (orthogonal to rotor flux)
$V_{BEMF}$—back EMF voltage
$V_{BEMF} = K_M \cdot \omega$
$P_{Losses} = P_W + P_{Fe} = P_{in} - P_{Mech}$
$P_W = (R_{WTA} + k_{rw} \cdot \Delta T)/((R_{WTA} + k_{rw} \cdot \Delta T) + (k_1 \cdot |\omega| + k_2 \cdot \omega^2)) \cdot P_{Losses}$
$P_{Fe} = (k_1 \cdot |\omega| + k_2 \cdot \omega^2)/((R_{WTA} + k_{rw} \cdot \Delta T) + (k_1 \cdot |\omega| + k_2 \cdot \omega^2)) \cdot P_{Losses}$ In accordance with at least one embodiment, calculations are performed according to the motor frame and winding temperature at steady state with constant power losses not being linear with the power losses. For example, the $R_{MA} = 1/[k_0 + k_T(T_M - T_A)]$ coefficient can be used to linearly approximate the nonlinearity. In accordance with at least one embodiment, calculations are performed according to the magnetic circuit losses creating lower winding temperature variation, as consideration of magnetic circuit losses allows more accurate winding temperature estimation and motor control.

The motor winding temperature transient at power losses step shows the characteristics which can be approximated with $T_M \cong R_{MA}/(\tau_1 \cdot s + 1) \cdot (P_{Fe} + P_{WM}^*) + T_A$ and $T_W \cong T_M + R_{WM} \cdot P_{WM}^*$ and $P_{WM}^* = 1/(\tau_2 \cdot s + 1) \cdot PW$ of small $\tau_2$ and higher $\tau_1$ (20 min*60=1200 seconds). As an example, an initialization winding temperature estimation error can be maintained at less than 5° C. As an example, a maximum winding temperature dynamic estimation error with 1st order model can be maintained at less than 20° C.

In accordance with various embodiments, different calculation options may be implemented. As an example, a first initialization option initializes the motor temperature after motor control circuit reset based on a measured resistance of a motor winding. As the motor winding has a thermal coefficient of resistivity and a given length, and cross-sectional area, a temperature of the motor winding can be determined based on measuring its resistance. For example, the winding resistance can be modeled according the estimated winding temperature $R_W = R_{WTA} + k_{rw} \cdot \Delta T$. As another example, a second input power calculation option can be used to calculate the power losses from the motor input power minus calculated mechanical power from the speed and torque current component $I_q$ (current component orthogonal to rotor flux). A model with a two-equation first-order system characterizing simplified winding and magnetic circuits can be used. The model inputs are power losses of the winding and magnetic circuit. Such model correlates with actual measurements.

While embodiments may be used for PMSMs and ACIMs, at least one embodiment may be practiced with a direct current (DC) motor. For example, even in a motor with no or minimal ferromagnetic losses, where the thermal resistance from the motor case to the ambient environment may be a dominant consideration, the motor temperatures can be estimated using a linear approximation of the non-linearity of the heat transfer from the motor case to the ambient environment, which can include radiative, convective, and conductive heat transfers. Estimated temperature feedback can be used to modify the thermal resistance coefficients $R_{MA} = 1/[k_0 + k_T(T_M - T_A)]$ to account for nonlinearity over the temperature range caused by convective and radiation heat transfers from the motor case, which can be especially useful for applications without a cooling fan.

In accordance with at least one embodiment, motor overload estimation is provided according to a nonlinear thermal model. Optionally, a new power losses calculation is used in runtime and temperature estimation is performed after processor reset.

Examples of products in which a motor control circuit utilizing a thermal model may be used include washing machines, dryers, compressors (refrigerators, freezers, air conditioners, etc.), dishwashers, circulating pumps, and products with motor drives in general.

Calculations:

Input power calculation for the thermal model may be performed, for example, according to the following equations, which are based on a phase invariant transformation of the 3-phase system to d, q plane:

$$P_{in} = \frac{3}{2} \cdot \vec{V} \cdot \vec{I} = \frac{3}{2} \cdot V \cdot I \cdot \cos(\varphi)$$

$$P_{in} = \frac{3}{2} \cdot (V_d \quad V_q) \cdot \begin{pmatrix} I_d \\ I_q \end{pmatrix}$$

$P_{in} = P_{Mech} + P_W + P_{Fe}$
$P_{Mech} = 3/2 \cdot [U_{BEMF} + (L_d - L_q) \cdot \omega \cdot i_d] \cdot i_q$
$P_W = 3/2 \cdot R_W \cdot I^2$
$I^2 = I_d^2 + I_q^2 = I_\alpha^2 + I_\beta^2$
$R_W = R_{W0} + k_{rw} \cdot \Delta T$
$P_{Fe}(I,\omega) = 3/2 \cdot R_{Fe} \cdot I^2$ For operations with a negative d current component, the $R_{Fe}$ is not too much dependent on the current amplitude, but it is frequency dependent.

$R_{Fe} = k_1 \cdot |\omega| + k_2 \cdot \omega^2$

Motor power calculations for the thermal model may be performed, for example, according to the following equations:

Phase invariant transformation of the 3-phase system to d, q plane $$P_{in} = \frac{3}{2} \cdot (V_d \quad V_q) \cdot \begin{pmatrix} I_d \\ I_q \end{pmatrix}$$

$P_{Mech} = 3/2 \cdot [V_{BEMF} + (L_d - L_q) \cdot \omega \cdot i_d] \cdot i_q$
$i_q$—torque current component (orthogonal to rotor flux)
$VB_{EMF}$ back EMF voltage
$V_{BEMF} = K_M \cdot \omega$
$P_{Losses} = P_W + P_{Fe} = P_{in} - P_{Mech}$
$P_W = 3/2 \cdot R_w \cdot I^2$
$R_W = R_{W0} + k_{rw} \cdot \Delta T$
$P_{Fe}(I,\omega) = 3/2 \cdot R_{Fe} \cdot I^2$ For operations with a negative d current component, the $R_{Fe}$ is not dependent on the current amplitude, but it is frequency dependent, so $R_{Fe}$ can be determined as follows:

$R_{Fe} = k_1 \cdot |\omega| + k_2 \cdot \omega^2$
$P_W = (R_{W0} + k_{rw} \cdot \Delta T)/((R_{W0} + k_{rw} \cdot \Delta T) + (k_1 \cdot |\omega| + k_2 \cdot \omega^2)) \cdot P_{Losses}$
$P_{Fe} = (k_1 \cdot |\omega| + k_2 \cdot \omega^2)/((R_{W0} + k_{rw} \cdot \Delta T) + (k_1 \cdot |\omega| + k_2 \cdot \omega^2)) \cdot P_{Losses}$ Voltage phase compensation for discrete input power calculation when full cycle pulse width modulation (PWM) update is used may be performed according to the following estimation:

$$[V_d \quad V_q](k) \cong [[V_d \quad V_q]] \cdot \left(k + \frac{\tau_S}{2}\right) \left\{ \begin{bmatrix} 1 & 0 \\ 0 & 1 \end{bmatrix} + \begin{bmatrix} 0 & -1 \\ 1 & 0 \end{bmatrix} \cdot (\Delta\theta(k)) \right\}$$

$\Delta\theta(k) = \theta(k + \tau_s/2) - \theta(k)$

Motor power calculations for the thermal model may be performed, for example, according to the following equations, which are based on a phase invariant transformation of the 3-phase system to d, q plane:

$$P_{in}(k) = \frac{3}{2} \cdot [V_d \quad V_q](k) \cdot \begin{bmatrix} I_d \\ I_q \end{bmatrix}(k)$$

According to at least one embodiment, full cycle sampling is used with full cycle PWM update. According to at least one embodiment, full cycle sampling is used with half cycle PWM update. Parameters such as the average voltage through the PWM cycle, current vectors, phase angle φ, and power factor can be determined at any given motor speed.

Motor power calculations for the thermal model may be performed, for example, according to the following equations:

$$P_{in}(k) = \frac{3}{2} \cdot [V_d \quad V_q](k) \cdot \begin{bmatrix} I_d \\ I_q \end{bmatrix}(k)$$

Discrete input power calculation can be performed, for example, with voltage phase compensation at full cycle pulse width modulation (PWM) update as follows:

$$\vec{V}((k) \cong e^{-J(\theta(k+\tau_d)-\theta(k))} \cdot \vec{V}(k|\tau_d)$$

$$I = \begin{bmatrix} 1 & 0 \\ 0 & 1 \end{bmatrix} \quad J = \begin{bmatrix} 0 & -1 \\ 1 & 0 \end{bmatrix}$$

$$\Delta\theta(k) = \theta(k+\tau_d) - \theta(k)$$

$$\vec{V}((k) \cong [I - J \cdot (\theta(k+\tau_d) - \theta(k))] \cdot \vec{V}(k+\tau_d)$$

$$\begin{bmatrix} V_d \\ V_q \end{bmatrix}(k) \cong \left\{ \left( \begin{bmatrix} 1 & 0 \\ 0 & 1 \end{bmatrix} + \begin{bmatrix} 0 & -1 \\ 1 & 0 \end{bmatrix} \cdot (-\Delta\theta(k)) \right) \right\} \cdot \begin{bmatrix} V_d \\ V_q \end{bmatrix}(k+\tau_d)$$

$$\tau_d = \tau_s/2$$

$$[V_d \quad V_q](k) \cong [[V_d \quad V_q]] \cdot \left(k + \frac{\tau_s}{2}\right) \left\{ \left( \begin{bmatrix} 1 & 0 \\ 0 & 1 \end{bmatrix} + \begin{bmatrix} 0 & -1 \\ 1 & 0 \end{bmatrix} \cdot (-\Delta\theta(k)) \right) \right\}$$

This can also be done using modified cosine and sine for a Clarke transformation as follows:

$$\begin{bmatrix} \cos(\theta(k+\tau_d)) \\ \sin(\theta(k+\tau_d)) \end{bmatrix} \cong \left\{ \left( \begin{bmatrix} 1 & 0 \\ 0 & 1 \end{bmatrix} + \begin{bmatrix} 0 & -1 \\ 1 & 0 \end{bmatrix} \cdot (\Delta\theta(k)) \right) \right\} \cdot \begin{bmatrix} \cos(\theta(k)) \\ \sin(\theta(k)) \end{bmatrix}$$

As an example, a motor control circuit or method can use a thermal model in Laplace domain, as shown below:

Motor mass temperature can be calculated as follows:
$T_M(s) = (R_{WM} \cdot C_W \cdot s + 1)/(R_{MA} \cdot C_M \cdot R_{WM} \cdot C_W \cdot s^2 + [R_{MA} \cdot (C_W + C_M) + R_{WM} \cdot C_W] \cdot s + 1) \cdot (R_{MA} \cdot P_{Fe}(s) + (R_{MA}/(R_{WM} \cdot C_W \cdot s + 1)) \cdot P_W(s) + T_A)$ This 3rd order model can be simplified to a 2nd order system:

$P_{WM}*(s) = 1/(\tau_2 \cdot s + 1) \cdot P_W(s)$
$T_M(s) \cong R_{MA}/(\tau_1 \cdot s + 1) \cdot (P_{Fe}(s) + P_{WM}*(s)) + T_A$
$\tau_2$—model time constant which corresponds to $R_{WM} C_W$
$\tau_1$—model time constant which corresponds to $R_{MA} C_M$
$\tau_s$—sampling time Motor winding temperature can be calculated as follows:
$T_W \approx T_M + R_{WM} \cdot P_{WM}*$ Total losses can be calculated as follows:
$P(k) = P_{Fe}(k) + P_{WM}*(k)$ A motor control circuit or method can be implemented using a discrete time thermal model, as shown below:
$T_M(k+1) = T_M(k) - \tau_s/\tau_1 \cdot [T_M(k) - T_A] + \tau_s/\tau_1 \cdot R_{MA} \cdot P(k)$ $R_{CA}$ represents the nonlinear convective, conductive and radiation heat transfers from the motor case, so the $R_{MA} = R_{MC} + R_{CA} = 1/[k_0 + k_T(T_M - T_A)]$.

$\tau_1$—model time constant is $R_{MA}$ dependent, it can be approximated with:
$\tau_1 = c \cdot R_{MA} = c/[k_0 + k_T \cdot (T_M(k) - T_A)]$
$T_M(k+1) = T_M(k) - \tau_s/c \cdot [k_0 + k_T \cdot (T_M(k) - T_A)] \cdot (T_M(k) - T_A) + \tau_s/c \cdot P(k)$
$P_{WM}*(k+1) = P_{WM}*(k) + \tau_s/\tau_2 \cdot (P_{WM}(k) - P_{WM}*(k))$
$T_W(k) \cong T_M(k) + R_{WM} \cdot P_{WM}*(k)$ $R_{CA}$ represents the nonlinear convective, conductive and radiation heat transfers from the motor case, so the $R_{MA} = R_{MC} + R_{CA} = 1/[k_0 + k_T(T_M - T_A)]$.

For example the power dissipation of thermal radiation component:
$P_r = \sigma \cdot S \cdot T^4$
σ Stefan-Boltzmann constant
S—surface
T—absolute temperature
$\Delta T = (T - T_A)$
$P_r = \sigma \cdot S \cdot (T_A + \Delta T)^4$
$P_r = \sigma \cdot S \cdot (T_A^4 + 4 \cdot T_A^3 \cdot \Delta T + 6 \cdot T_A^2 \Delta T^2 + 4 \cdot T_A \cdot \Delta T^3 + \Delta T^4)$ When motor case temperature is a follows:
$T = 165° C. = 438K \quad T_A = 25° C. = 298K \quad \Delta T = T - T_A = 140K$
$P_r = c \cdot (1 + 1.88 + 1.32 + 0.41 + 0.05)$
So the 3rd and 4th order can be neglected.
$P_r = \sigma \cdot S \cdot (T_A^4 + 4 \cdot T_A^3 \cdot \Delta T + 6 \cdot T_A^2 \cdot \Delta T^2)$ The power dissipation of thermal radiation component can be simplified as:
$P_r = \sigma \cdot S \cdot (T_A^4 + 4 \cdot T_A^3 \cdot \Delta T + 6 \cdot T_A^2 \cdot \Delta T^2)$ The other power dissipation components—convective and conductive equations are even closer to 2nd order equation. Therefore the motor mass to ambient power dissipation can be described with a 2nd order equation:

$R_{CA}$ represents the nonlinear convective, conductive and radiation heat transfers from the motor case, so the $R_{MA} = R_{MC} + R_{CA} = 1/[k_0 + k_T(T_M - T_A)]$.
$P_{MA} = k_0 \cdot \Delta T + k_T \cdot \Delta T^2$
$1/R_{MA} = P_{MA}/\Delta T$
$1/R_{MA} = k_0 + k_T \cdot (T - T_A)$ The above calculations include variables according to the following definitions:

DEFINITIONS $T_W$—temperature of the motor winding
$T_S$—temperature of the stator (ferromagnetic circuit—stator)
$T_R$—temperature of the rotor (ferromagnetic circuit—rotor)
$T_C$—motor case temperature
$T_A$—ambient temperature used for the (usually 25° C.) thermal calculations
$P_W$—power losses in motor winding
$P_S$—power losses in stator $P_R$—power losses in rotor
$C_W$—motor winding thermal capacity
$C_S$—stator thermal capacity
$C_R$—rotor winding thermal capacity
$R_{WS}$—thermal resistance winding to stator
$R_{RS}$—thermal resistance rotor to stator
$R_{CA}$—thermal resistance motor case to ambient
$R_{SC}$—thermal resistance stator to motor case
$R_{sa}=R_{sc}+R_{CA}$—thermal resistance stator to ambient
$a_{20}$, $a_{2t}$—conductivity model coefficients—linear approximation covers the convective, conductive and radiation heat transfers from the motor case to ambient temperature $\Delta T = T_{Fe} - T_A$ In accordance with at least one embodiment, a method is performed in an electric motor control circuit of an electric motor. The method comprises measuring a winding resistance of a motor winding, determining a winding temperature of a motor winding based upon the winding resistance, accessing thermal model parameters, wherein at least one of the thermal model parameters is a winding temperature obtained from measuring a winding resistance of a motor winding, calculating a simulated operation of the electric motor according to a thermal model of the electric motor based upon the thermal model parameters including the winding temperature and a stator-to-ambient thermal resistance value accounting for a sum of a stator-to-case thermal resistance and a case-to-ambient thermal resistance, and controlling an actual operation of the electric motor based upon the simulated operation of the electric motor according to the thermal model, wherein the calculating the simulated operation is performed iteratively during the actual operation. In accordance with at least one embodiment, the method comprises initializing a thermal model parameter by storing a value in a storage location. In accordance with at least one embodiment, the controlling the actual operation of the electric motor based upon the simulated operation of the electric motor according to the thermal model comprises discontinuing application of power to the electric motor when the simulated operation indicates an overtemperature condition of the electric motor. In accordance with at least one embodiment, the controlling the actual operation of the electric motor based upon the simulated operation of the electric motor according to the thermal model comprises reducing power dissipation of the electric motor when the simulated operation indicates a trend toward an overtemperature condition of the electric motor. In accordance with at least one embodiment, the controlling the actual operation of the electric motor based upon the simulated operation of the electric motor according to the thermal model occurs in absence of an electromechanical thermal switch. In accordance with at least one embodiment, the controlling the actual operation of the electric motor based upon the simulated operation of the electric motor according to the thermal model comprises verifying operation of an electromechanical thermal switch. In accordance with at least one embodiment, the calculating the simulated operation of the electric motor according to the thermal model of the electric motor based upon the thermal model parameter comprises calculating an electric motor input power based on a voltage and a current, calculating an electric motor output power based on an electric motor shaft speed and an electric motor shaft torque, calculating an electric motor winding power loss based on the electric motor input power and the electric motor output power, calculating an electric motor ferromagnetic circuit power loss based on the electric motor input power and the electric motor output power, calculating an electric motor winding temperature based on the electric motor winding power loss, and calculating an electric motor mass temperature based on the electric motor winding power loss, the electric motor ferromagnetic circuit power loss, and the stator-to-ambient thermal resistance. In accordance with at least one embodiment, the calculating the simulated operation of the electric motor comprises calculating an electric motor winding temperature according to a first differential equation and calculating an electric motor mass temperature according to a second differential equation.

In accordance with at least one embodiment, an electric motor control circuit comprises a back electromotive force (EMF) measurement circuit, a winding resistance measurement circuit, a processor coupled to the back EMF measurement circuit and to the winding resistance measurement circuit to receive a back EMF measurement and a winding resistance measurement and to calculate a simulated operation of the electric motor according to a thermal model of the electric motor, the thermal model based on a stator-to-ambient thermal resistance value accounting for a sum of a stator-to-case thermal resistance and a case-to-ambient thermal resistance, and an electric motor driver circuit coupled to the processor for providing drive signals for controlling delivery of power to the electric motor based on the simulated operation of the electric motor according to the thermal model of the electric motor. In accordance with at least one embodiment, the electric motor control circuit comprises a memory coupled to the processor, wherein the processor is configured to initialize a thermal model parameter by storing a value in a storage location. In accordance with at least one embodiment, the processor is configured to cause the electric motor driver circuit to discontinue application of power to the electric motor when the simulated operation of the electric motor according to the thermal model of the electric motor indicates an overtemperature condition of the electric motor. In accordance with at least one embodiment, the processor is configured to reduce power dissipation of the electric motor when the simulated operation of the electric motor according to the thermal model of the electric motor indicates a trend toward an overtemperature condition of the electric motor. In accordance with at least one embodiment, the electric motor control circuit is configured to control operation of the electric motor according to the thermal model of the electric motor in absence of an electromechanical thermal switch. In accordance with at least one embodiment, the electric motor control circuit is configured to verify operation of an electromechanical thermal switch. In accordance with at least one embodiment, the processor is configured to calculate an electric motor input power based on a voltage and a current, to calculate an electric motor output power based on an electric motor shaft speed and an electric motor shaft torque, to calculate an electric motor winding power loss based on the electric motor input power and the electric motor output power, to calculate an electric motor ferromagnetic circuit power loss based on the electric motor input power and the electric motor output power, to calculate an electric motor winding temperature based on the electric motor winding power loss, and to calculate an electric motor mass temperature based on the electric motor winding power loss, the electric motor ferromagnetic circuit power loss, and the stator-to-ambient thermal resistance, wherein the thermal model of the electric motor is dependent on the electric motor mass temperature. In accordance with at least one embodiment, the processor is configured to calculate simulated operation of the electric motor according to the thermal model of the electric motor by calculating an electric motor winding temperature according to a first differential equation and by calculating an electric motor mass temperature according to a second differential equation.

In accordance with at least one embodiment, an integrated circuit comprises a back electromotive force (EMF) measurement circuit, a winding resistance measurement circuit, a processor coupled to the back EMF measurement circuit and to the winding resistance measurement circuit and configured to receive a back EMF measurement and a winding resistance measurement and to calculate a simulated operation of the electric motor according to a thermal model of the electric motor, the thermal model based on a stator-to-ambient thermal resistance value accounting for a sum of a stator-to-case thermal resistance and a case-to-ambient thermal resistance; and an electric motor driver circuit coupled to the processor for providing drive signals for controlling delivery of power to the electric motor based on the simulated operation of the electric motor according to the thermal model of the electric motor. In accordance with at least one embodiment, the integrated circuit comprises a memory coupled to the processor, the processor configured to initialize a thermal model parameter by storing a value in a storage location. In accordance with at least one embodiment, the processor is configured to cause the electric motor driver circuit to discontinue application of power to the electric motor when the simulated operation of the electric motor according to the thermal model of the electric motor indicates an overtemperature condition of the electric motor. In accordance with at least one embodiment, the processor is configured to reduce power dissipation of the electric motor when the simulated operation of the electric motor according to the thermal model of the electric motor indicates a trend toward an overtemperature condition of the electric motor. In accordance with at least one embodiment, the integrated circuit is configured to control operation of the electric motor based on the simulated operation of the electric motor according to the thermal model of the electric motor in absence of an electromechanical thermal switch. In accordance with at least one embodiment, the integrated circuit is configured to verify operation of an electromechanical thermal switch. In accordance with at least one embodiment, the processor is configured to calculate an electric motor input power based on a voltage and a current, to calculate an electric motor output power based on an electric motor shaft speed and an electric motor shaft torque, to calculate an electric motor winding power loss based on the electric motor input power and the electric motor output power, to calculate an electric motor ferromagnetic circuit power loss based on the electric motor input power and the electric motor output power, to calculate an electric motor winding temperature based on the electric motor winding power loss, and to calculate an electric motor mass temperature based on the electric motor winding power loss, the electric motor ferromagnetic circuit power loss, and the stator-to-ambient thermal resistance, wherein the thermal model of the electric motor is dependent on the electric motor mass temperature.

What is claimed is:

1. A method, performed in an electric motor control circuit of an electric motor, comprising:
    measuring a winding resistance of a motor winding;
    determining a winding temperature of a motor winding based upon the winding resistance;
    accessing thermal model parameters, wherein at least one of the thermal model parameters is a winding temperature obtained from measuring a winding resistance of a motor winding;
    calculating a simulated operation of the electric motor according to a thermal model of the electric motor based upon the thermal model parameters including the winding temperature and a stator-to-ambient thermal resistance value accounting for a sum of a stator-to-case thermal resistance and a case-to-ambient thermal resistance; and
    controlling an actual operation of the electric motor based upon the simulated operation of the electric motor according to the thermal model, wherein the calculating the simulated operation is performed iteratively during the actual operation.

2. The method of claim 1 wherein the controlling the actual operation of the electric motor based upon the simulated operation of the electric motor according to the thermal model comprises:
    discontinuing application of power to the electric motor when the simulated operation indicates an overtemperature condition of the electric motor.

3. The method of claim 1 wherein the controlling the actual operation of the electric motor based upon the simulated operation of the electric motor according to the thermal model comprises:
    reducing power dissipation of the electric motor when the simulated operation indicates a trend toward an overtemperature condition of the electric motor.

4. The method of claim 1 wherein the controlling the actual operation of the electric motor based upon the simulated operation of the electric motor according to the thermal model occurs in absence of an electromechanical thermal switch.

5. The method of claim 1 wherein the controlling the actual operation of the electric motor based upon the simulated operation of the electric motor according to the thermal model comprises:
    verifying operation of an electromechanical thermal switch.

6. The method of claim 1 wherein the calculating the simulated operation of the electric motor according to the thermal model of the electric motor based upon the thermal model parameter comprises:
    calculating an electric motor input power based on a voltage and a current;
    calculating an electric motor output power based on an electric motor shaft speed and an electric motor shaft torque;
    calculating an electric motor winding power loss based on the electric motor input power and the electric motor output power;
    calculating an electric motor ferromagnetic circuit power loss based on the electric motor input power and the electric motor output power;
    calculating an electric motor winding temperature based on the electric motor winding power loss; and
    calculating an electric motor mass temperature based on the electric motor winding power loss, the electric motor ferromagnetic circuit power loss, and the stator-to-ambient thermal resistance.

7. The method of claim 1 wherein the calculating the simulated operation of the electric motor comprises calculating an electric motor winding temperature according to a first differential equation and calculating an electric motor mass temperature according to a second differential equation.

8. An electric motor control circuit comprising:
    a back electromotive force (EMF) measurement circuit;
    a winding resistance measurement circuit;

a processor coupled to the back EMF measurement circuit and to the winding resistance measurement circuit to receive a back EMF measurement and a winding resistance measurement and to calculate a simulated operation of the electric motor according to a thermal model of the electric motor, the thermal model based on a stator-to-ambient thermal resistance value accounting for a sum of a stator-to-case thermal resistance and a case-to-ambient thermal resistance; and an electric motor driver circuit coupled to the processor for providing drive signals for controlling delivery of power to the electric motor based on the simulated operation of the electric motor according to the thermal model of the electric motor.

9. The electric motor control circuit of claim 8 wherein the processor is configured to cause the electric motor driver circuit to discontinue application of power to the electric motor when the simulated operation of the electric motor according to the thermal model of the electric motor indicates an overtemperature condition of the electric motor.

10. The electric motor control circuit of claim 8 wherein the processor is configured to reduce power dissipation of the electric motor when the simulated operation of the electric motor according to the thermal model of the electric motor indicates a trend toward an overtemperature condition of the electric motor.

11. The electric motor control circuit of claim 8 wherein the electric motor control circuit is configured to control operation of the electric motor according to the thermal model of the electric motor in absence of an electromechanical thermal switch.

12. The electric motor control circuit of claim 8 wherein the electric motor control circuit is configured to verify operation of an electromechanical thermal switch.

13. The electric motor control circuit of claim 8 wherein the processor is configured to calculate an electric motor input power based on a voltage and a current, to calculate an electric motor output power based on an electric motor shaft speed and an electric motor shaft torque, to calculate an electric motor winding power loss based on the electric motor input power and the electric motor output power, to calculate an electric motor ferromagnetic circuit power loss based on the electric motor input power and the electric motor output power, to calculate an electric motor winding temperature based on the electric motor winding power loss, and to calculate an electric motor mass temperature based on the electric motor winding power loss, the electric motor ferromagnetic circuit power loss, and the stator-to-ambient thermal resistance, wherein the thermal model of the electric motor is dependent on the electric motor mass temperature.

14. The electric motor control circuit of claim 8 wherein the processor is configured to calculate simulated operation of the electric motor according to the thermal model of the electric motor by calculating an electric motor winding temperature according to a first differential equation and by calculating an electric motor mass temperature according to a second differential equation.

15. An integrated circuit comprising:
a back electromotive force (EMF) measurement circuit;
a winding resistance measurement circuit;
a processor coupled to the back EMF measurement circuit and to the winding resistance measurement circuit and configured to receive a back EMF measurement and a winding resistance measurement and to calculate a simulated operation of the electric motor according to a thermal model of the electric motor, the thermal model based on a stator-to-ambient thermal resistance value accounting for a sum of a stator-to-case thermal resistance and a case-to-ambient thermal resistance; and
an electric motor driver circuit coupled to the processor for providing drive signals for controlling delivery of power to the electric motor based on the simulated operation of the electric motor according to the thermal model of the electric motor.

16. The integrated circuit of claim 14 wherein the processor is configured to cause the electric motor driver circuit to discontinue application of power to the electric motor when the simulated operation of the electric motor according to the thermal model of the electric motor indicates an overtemperature condition of the electric motor.

17. The integrated circuit of claim 14 wherein the processor is configured to reduce power dissipation of the electric motor when the simulated operation of the electric motor according to the thermal model of the electric motor indicates a trend toward an overtemperature condition of the electric motor.

18. The integrated circuit of claim 14 wherein the integrated circuit is configured to control operation of the electric motor based on the simulated operation of the electric motor according to the thermal model of the electric motor in absence of an electromechanical thermal switch.

19. The integrated circuit of claim 14 wherein the integrated circuit is configured to verify operation of an electromechanical thermal switch.

20. The integrated circuit of claim 14 wherein the processor is configured to calculate an electric motor input power based on a voltage and a current, to calculate an electric motor output power based on an electric motor shaft speed and an electric motor shaft torque, to calculate an electric motor winding power loss based on the electric motor input power and the electric motor output power, to calculate an electric motor ferromagnetic circuit power loss based on the electric motor input power and the electric motor output power, to calculate an electric motor winding temperature based on the electric motor winding power loss, and to calculate an electric motor mass temperature based on the electric motor winding power loss, the electric motor ferromagnetic circuit power loss, and the stator-to-ambient thermal resistance, wherein the thermal model of the electric motor is dependent on the electric motor mass temperature.

* * * * *